US009331315B1

(12) United States Patent
Goulden et al.

(10) Patent No.: US 9,331,315 B1
(45) Date of Patent: May 3, 2016

(54) SOLDERLESS BATTERY CONTACT

(71) Applicant: AMAZON TECHNOLOGIES, INC., Reno, NV (US)

(72) Inventors: Jason Evans Goulden, Los Gatos, CA (US); Manuel Rinley Deeds, III, Boulder Creek, CA (US); Mi Zhou, Santa Clara, CA (US); Shelomon Patrick Doblack, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 233 days.

(21) Appl. No.: 14/041,253

(22) Filed: Sep. 30, 2013

(51) Int. Cl.
*H01M 2/10* (2006.01)
*H01M 2/20* (2006.01)

(52) U.S. Cl.
CPC ............ *H01M 2/1022* (2013.01); *H01M 2/105* (2013.01); *H01M 2/1005* (2013.01); *H01M 2/202* (2013.01)

(58) Field of Classification Search
CPC .... H01M 2/1005; H01M 2/105; H01M 2/202
See application file for complete search history.

(56) References Cited

U.S. PATENT DOCUMENTS

| 2007/0026315 | A1 | 2/2007 | Lampe-Onnerud et al. |
| 2007/0275299 | A1* | 11/2007 | Larsen ............... H01M 2/1022 429/100 |
| 2009/0111018 | A1 | 4/2009 | Park et al. |
| 2011/0210696 | A1 | 9/2011 | Inoue |

OTHER PUBLICATIONS

Zhang, Rachel L., "Non-Final Office Action dated Sep. 10, 2015", U.S. Appl. No. 14/041,303, The United States Patent and Trademark Office, Sep. 10, 2015.
Fraser, Stewart A., "Notice of Allowance dated Dec. 30, 2015", U.S. Appl. No. 14/041,303, The United States Patent and Trademark Office, Dec. 30, 2015.

* cited by examiner

*Primary Examiner* — Jane Rhee
(74) *Attorney, Agent, or Firm* — Lindauer Law, PLLC

(57) ABSTRACT

Described in this disclosure are battery contacts for use in electronic devices usable without soldering to a circuit board. The battery contact includes one or more contact features supported by leaf springs. The contact features touch a corresponding pad on the circuit board at time of assembly, providing an electrically conductive pathway. One or more of the battery contacts may include a spring-biased member configured to apply pressure to one or more batteries.

20 Claims, 14 Drawing Sheets

SOLDERLESS BATTERY CONTACT

BACKGROUND

Batteries or other devices provided in battery-like form factors provide electrical power to operate a wide variety of devices. These batteries may be single-use or rechargeable, and may incorporate one or more galvanic cells, fuel cells, capacitors, and so forth. Battery contacts provide an electrically conductive pathway from one or more terminals of one or more batteries to the electrical components of the device.

Figure 1:
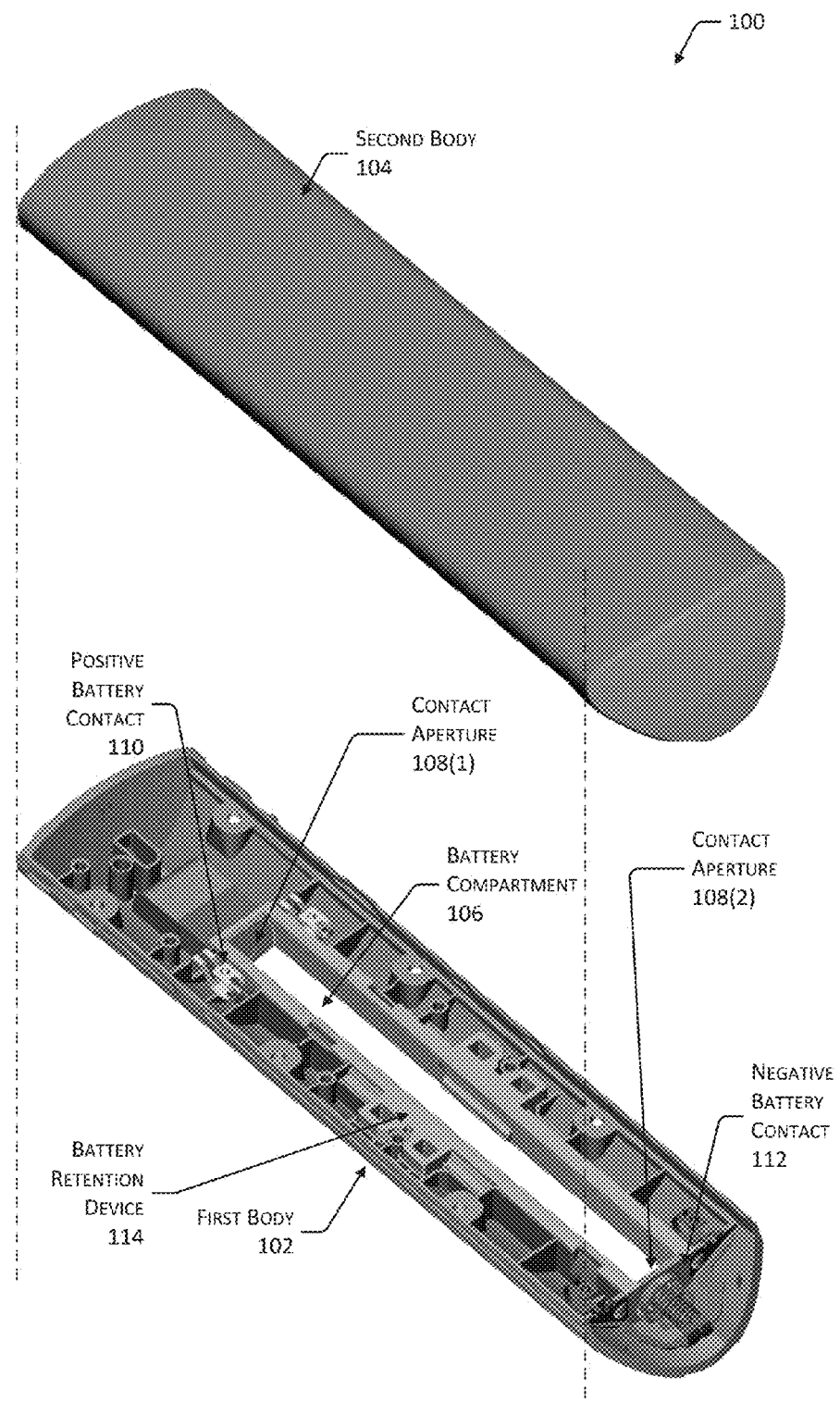
FIG. 1 is an illustrative portable electronic device having a first body and a second body within which are mounted a solderless positive battery contact, a solderless negative battery contact, and a battery retention device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Electronic devices consume power during operation. Electronic devices ranging from a remote control for a media device to toys may use batteries or other devices to provide that power. The batteries may use galvanic cells, fuel cells, capacitors, and so forth to provide power to the device. The electronic device may be configured to accept a particular physical form factor of battery. For example, the remote control may be configured to use two or more batteries in the "AAA" form factor, with each battery having an approximate length of 44.5 millimeters ("mm") and a circular cross section with a diameter of about 10.5 mm.

A battery contact provides part of an electrical pathway along which current flows from a terminal on the battery to portions of the electronic device which consume the power. Traditionally, the battery contact has been soldered directly to a circuit board, or connected to the circuit board using a wire which is soldered to a portion of the battery contact. Soldering involves melting and flowing a filler metal, or solder, to join two or more metal parts. In comparison, welding melts at least a portion of the two or more pieces to be joined.

Soldering may provide an electrically conductive and mechanically sturdy joint. However, the soldering process requires physical access to the two or more metal parts. For example, soldering the battery contact directly to the circuit board requires that the melted solder be introduced into the join between a portion of the battery contact and a trace or contact on the circuit board. The need to access the parts to perform the soldering may preclude particular physical arrangements of the electronic device. This may introduce limitations on overall design, assembly, fabrication of parts, and so forth associated with the electronic device.

Within the device, the installed battery contacts are configured to touch one or more terminals of an installed battery. For example, a positive battery contact and a negative battery contact may come in contact with a positive terminal and a negative terminal, respectively, of one or more AAA batteries. Current may flow from the one or more batteries to the electronic components in the device by way of the battery contacts.

The installed batteries may be located within a battery compartment. In some implementations, one or more of the battery contacts may apply a force to the one or more batteries to maintain the electrical connection. Within traditional devices the one or more batteries may rattle or shift during usage. This may result in noise, an unpleasant physical sensation due to the shifting mass of the batteries, and so forth.

Described in this disclosure are solderless battery contacts configured to be installed and assembled into an electronic device without solder. The solderless battery contacts may include one or more leaf springs having one or more contact features. The leaf springs are configured to, in the assembled state, press the one or more contact features against an electrical contact pad on a circuit board of the electronic device. The solderless battery contact may have a battery contact feature configured to come in contact with a terminal of an installed battery. The battery compartment and solderless battery contact may be configured such that an incorrect terminal of the battery contact feature will not come in contact with the battery contact feature. This may prevent damage to electrical components in the electronic device due to application of voltage with an incorrect polarity.

The solderless battery contact may include a battery contact cap configured to be biased with a spring element such that the cap presses against a terminal of an installed battery. The spring element may also be configured to apply a force to the installed battery. The solderless battery contacts provide an electrically conductive path between the battery contact feature or battery contact cap and the contact features on the one or more leaf springs.

The electronic device may be configured with a battery retention structure within at least a portion of the battery compartment. The battery retention structure may include an elastomeric material, such as silicone rubber, configured to be partially deformed upon installation of one or more batteries. The battery retention structure may include one or more retention features such as ridges, concavities, and so forth.

The battery retention structure may be placed proximate to an interface between two or more batteries which are arranged in tandem and connected in series electrically. For example, a pair of AAA batteries may be arranged in the battery compartment in tandem, electrically in series such that a battery junction of the two batteries is where a positive terminal of one battery touches the negative terminal of another battery. From this column of batteries which are in electrical and physical contact, the resultant voltage is a sum of that provided by the individual batteries.

The battery retention structure may be placed proximate to the battery junction. The battery retention structure may prevent Euler buckling of the batteries after installation, which may otherwise result from the compression provided by the battery contact cap as biased by the spring feature. The battery retention structure may include one or more compliance cavities configured to improve compliance or deflection of a portion of the battery retention structure in response to an applied force, such as during installation of the batteries.

When assembled, the battery compartment may be proximate to the circuit board. The battery retention structure may include a battery compartment-circuit board gasket ("gasket"). For example, the silicon rubber may form the shape of the battery retention structure and the gasket as an integral structure. The gasket, being of a compliant or resilient material also provides mechanical support between the circuit board and the battery compartment. For example, the circuit board may comprise a keypad which includes buttons configured to be pressed by a person. When assembled, the gasket behind the circuit board provides mechanical support minimizing movement of the circuit board relative to the battery compartment upon application of a force by the person pressing a button. Furthermore, the gasket may minimize migration of material between the battery compartment and the circuit board. For example, the gasket may prevent dirt in the battery compartment from moving to the circuit board.

Using the solderless battery contacts, the battery retention structure and integral battery compartment-circuit board gasket, or both, robust and low profile electronic devices may be constructed. For example, the solderless battery contacts and the compliance provided by the gasket allow the electronic device to be constructed in two separate halves and easily joined without soldering. User experience during usage of the device is improved in several ways. The battery retention device maintains the position of the batteries within the battery compartment without buckling, shifting or rattling. Additionally, the gasket may provide additional mechanical support to the circuit board, reducing deflecting during operation, such as when the person activates a button on a keypad on the circuit board.

Illustrative Devices

FIG. 1 is an exploded view of an illustrative portable electronic device 100. The electronic device 100 may generally be divided into two halves, a first body 102 and a second body 104. The first body 102 and the second body 104, when assembled, contain the parts of the electronic device 100.

Within the first body 102 is a battery compartment 106. The battery compartment 106 describes a volume within which one or more batteries may be installed to provide electrical power to one or more electronic components in the electronic device 100. The battery compartment 106 may comprise a portion or structure of the first body 102, or may comprise a separate piece which is mounted to or arranged within at least a portion of the first body 102. The battery compartment 106 may have one or more contact apertures 108 arranged at one or more sides of the battery compartment 106. The contact apertures 108 provide a pathway or channel. The contact apertures 108 may be formed, drilled, cut, punched, and so forth in the material of the battery compartment 106.

A positive battery contact 110 is arranged at a first end of the battery compartment 106 and is proximate to a first contact aperture 108(1). The first contact aperture 108(1) may be configured to pass a protrusion of a positive terminal of a battery as installed in the battery compartment 106 through the wall of the battery compartment 106 and come into contact with a portion of the positive battery contact 110. The first contact aperture 108(1) may also be configured to not pass a negative terminal of the battery as installed in the battery compartment 106. This configuration prevents damage due to improper installation of the batteries having a positive terminal which protrudes. In one implementation configured for the AAA battery form factor, the first contact aperture 108(1) may be circular in cross section with a diameter of about 4 mm. In this implementation, the positive terminal on a AAA battery will be able to pass through the first contact aperture 108(1) and come in contact with the positive battery contact 110. However, an incorrectly installed AAA presenting a negative terminal which lacks the protruding feature and is too wide at about 10 mm would be unable to come into electrical contact with the positive battery contact 110. As a result, this design prevents damage to the electronic components resulting from improper battery installation. In other implementations, the first contact aperture 108(1) may describe a different cross section such as elliptical, square, triangular, hexagonal, and so forth.

A negative battery contact 112 is arranged at a second end of the battery compartment 106 and is proximate to a second contact aperture 108(2). As described below, the second contact aperture 108(2) may be configured to pass an electrically conductive member extending from the negative battery contact 112 through the wall of the battery compartment 106 and touch a negative battery terminal of a negative battery installed in the battery compartment 106.

The battery compartment 106 may be configured to accept a plurality of batteries. These batteries may be placed in a tandem arrangement, such that the batteries are coupled with a positive terminal of a first battery in electrical contact with a negative terminal of a second battery. In some implementations, one or more of the battery contacts may be configured to apply a force to the batteries to maintain positive physical and electrical contact between the batteries and the contacts. For example, the negative battery contact 112 may include a spring element configured to apply a compressive force along a long tandem or common axis extending through the tandem batteries. The tandem arrangement acts as a column, and application of the compressive force may result in Euler-like buckling of the column. For example, the compressive force may result in a tandem pair of batteries buckling outwards from the battery compartment 106 at a junction between the two batteries. Such a buckling may make installation of a battery cover (not illustrated) difficult for a person.

To mitigate or prevent this buckling, arranged within at least a portion of the battery compartment 106 may be a battery retention device 114. The battery retention device 114 may comprise an elastomeric material, such as silicone rubber, formed to provide one or more retention features and an integral battery compartment-circuit board gasket ("gasket"). The retention features are configured to deform upon installation of the batteries into the battery compartment and prevent buckling of the batteries at the junction between the batteries. The battery retention device 114 is configured to allow at least some movement of the batteries along the tandem axis, such that the compression applied to the batteries maintains physical and electrical contact between the positive battery contact 110, the batteries, and the negative battery contact 112. This provides a reliable electrical pathway to allow current to flow between the batteries and the electronic components in the electronic device 100.

The positive battery contact 110 and the negative battery contact 112 are described for use in one implementation to come in contact with a positive battery terminal of a battery and a negative battery terminal of a battery, respectively. However, in some implementations, the battery contacts may be configured for use with an opposing polarity. For example, a structure the same or similar to the positive battery contact 110 may be used as a negative battery contact. Likewise, a structure the same or similar to the negative battery contact 112 may be used as a positive battery contact.

While a portable electronic device 100 is depicted, in other implementations the electronic device 100 may be stationary, semi-portable, implanted, and so forth. The device 100 may be configured such that the batteries may be removed or replaced by an end user, or may be permanently installed such as during assembly of the device 100.

Figure 2:
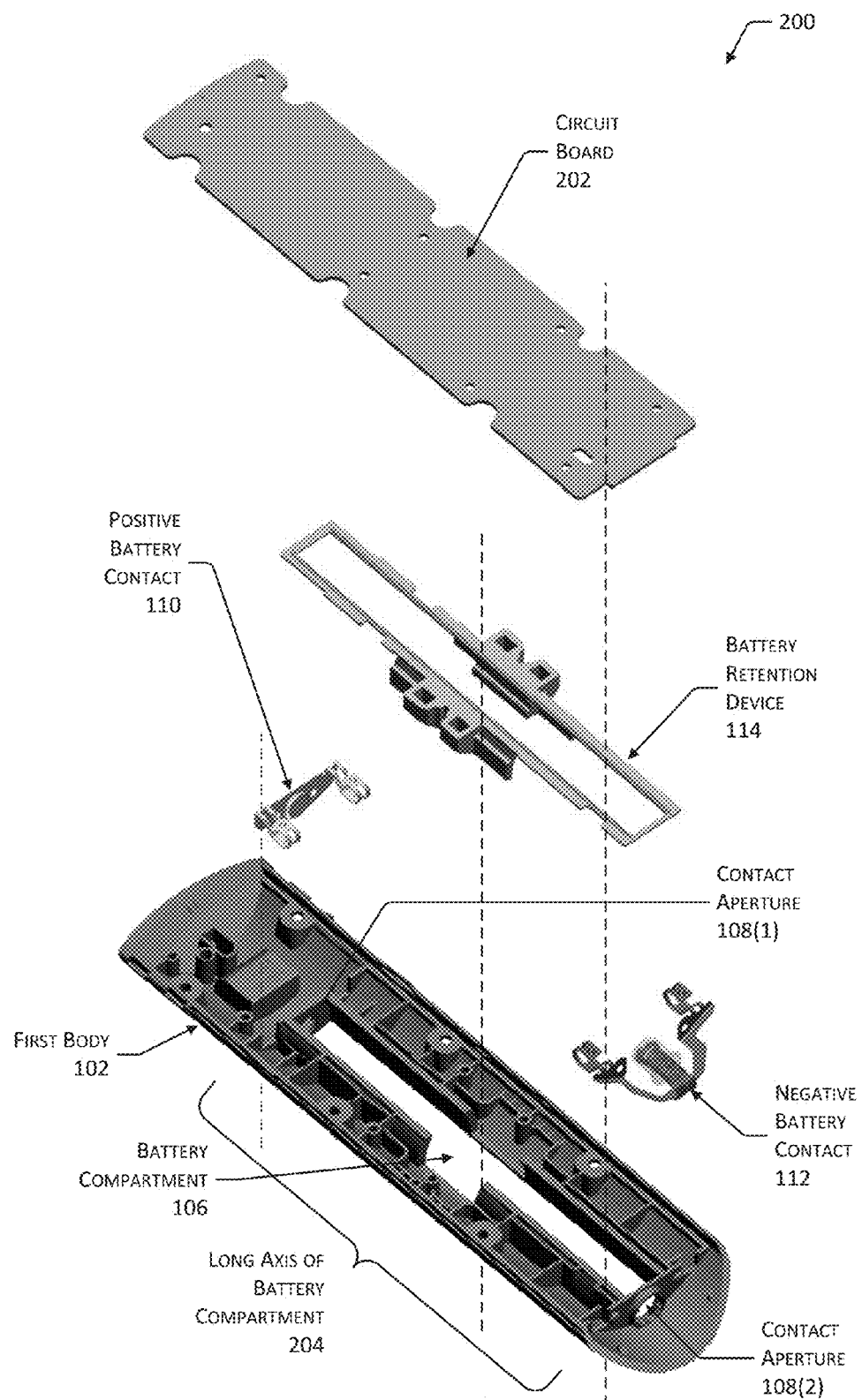
FIG. 2 illustrates an exploded view of the positive battery contact, the negative battery contact, the battery retention device, and a circuit board relative to the first body.

FIG. 2 illustrates an exploded view 200 of the electronic device 100. In this illustration, the second body 104 has been omitted for clarity. In this view the positive battery contact 110, the negative battery contact 112, and the battery retention device 114 are separated to illustrate relative positions.

A circuit board 202 is shown, which may be mounted within the second body 104. The circuit board 202 may include one or more electronic components and include one or more contact pads. The contact pads are configured to physically touch one or more of the contact features of the positive battery contact 110 and the negative battery contact 112.

The positive battery contact 110 and the negative battery contact 112 are depicted as being outside of the battery compartment 106. However, in some implementations one or both of these contacts may be arranged at least partially within the battery compartment 106.

The battery retention device 114 extends within at least a portion of the battery compartment 106. The battery retention device 114 may provide a battery compartment-circuit board gasket ("gasket"). The gasket may be arranged at an interface between at least a portion of the circuit board 202 and battery compartment 106 of the first body 102. The interface may comprise where the circuit board 202 and the battery compartment 106 come closest to one another. This gasket is described in more detail below with regard to FIG. 9. The battery retention device 114 may thus provide mechanical support to the circuit board 202.

A long axis of the battery compartment ("long axis") 204 is illustrated here. The long axis 204 extends lengthwise from a first end of the battery compartment 106 to a second end. The long axis 204 may be considered to extend along a longest dimension of the battery compartment 106. The ends of the battery compartment 106 may be fixed. A lengthwise opening having a longest dimension extending along the long axis 204 provides access to the battery compartment 106. In one implementation a battery cover or door may extend along the lengthwise opening during typical usage to conceal the batteries. To load or unload the batteries the battery cover may be opened or removed.

Figure 3:
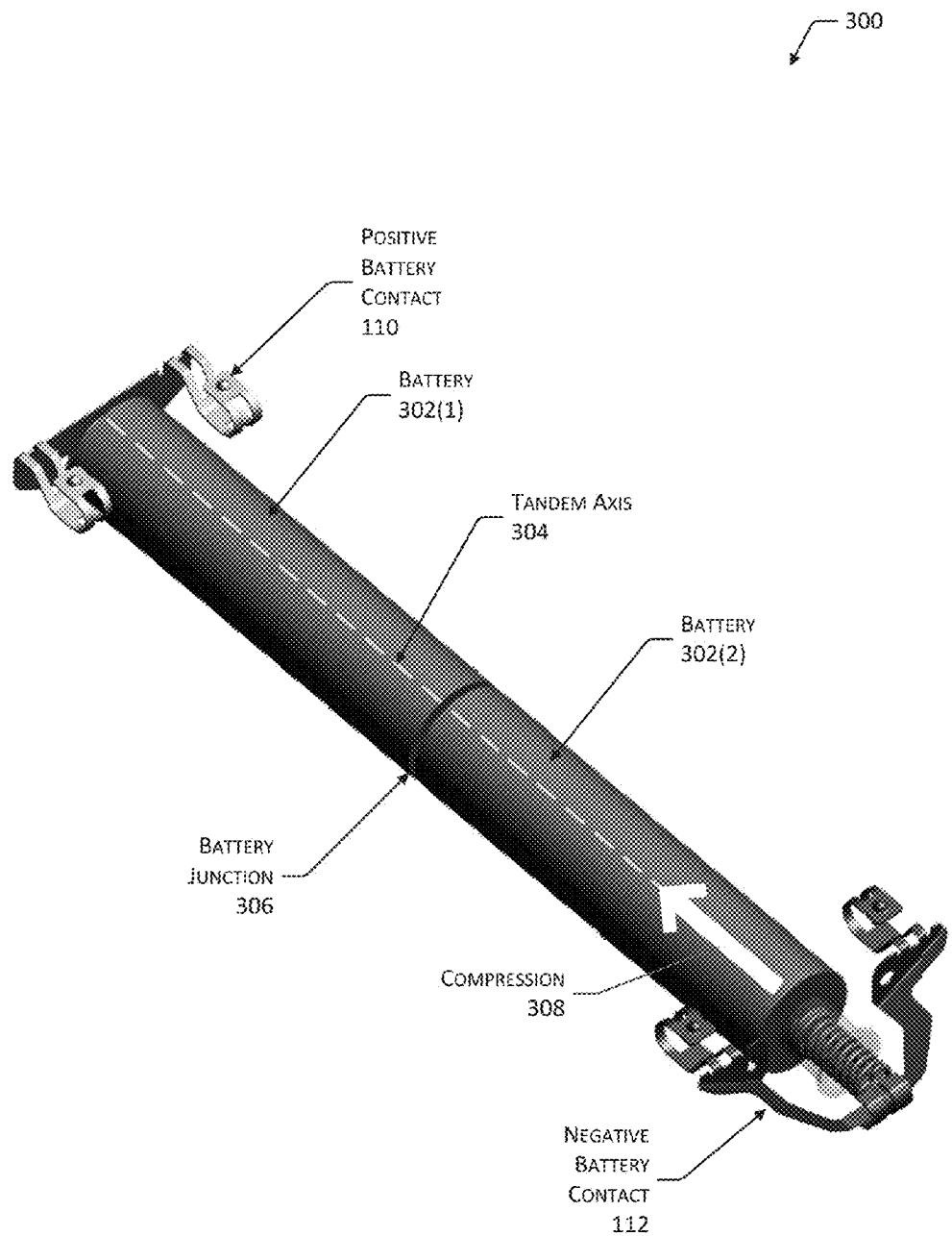
FIG. 3 illustrates an enlarged view of the positive battery contact and the negative battery contact as coupled to a pair of batteries in a tandem series arrangement.

FIG. 3 illustrates an enlarged view 300 of the positive battery contact 110 and the negative battery contact 112. For clarity, the first body 102 including the battery compartment 106 and the battery retention device 114 have been omitted. In this illustration a pair of batteries 302(1) and 302(2) are placed in a series or tandem arrangement having a tandem axis 304. In the tandem arrangement, a positive terminal of the battery 302(2) is in electrical contact with the negative terminal of the battery 302(1) at a battery junction 306. A positive terminal of the battery 302(1) is in electrical contact with a portion of the positive battery contact 110. A negative terminal of the battery 302(2) is in electrical contact with a portion of the negative battery contact 112. In this illustration, the negative battery contact 112 is configured to apply a force along the tandem axis 304. This force produces compression 308 and maintains physical and electrical contact between the negative battery contact 112, the batteries 302(1)-(2), and the positive battery contact 110.

The batteries 302 may include one or more current sources such as galvanic cells, fuel cells, capacitors, and so forth. The batteries 302 may be cylindrical in cross section, such as illustrated here. The batteries 302 may be single use, rechargeable, and so forth.

Figure 4:
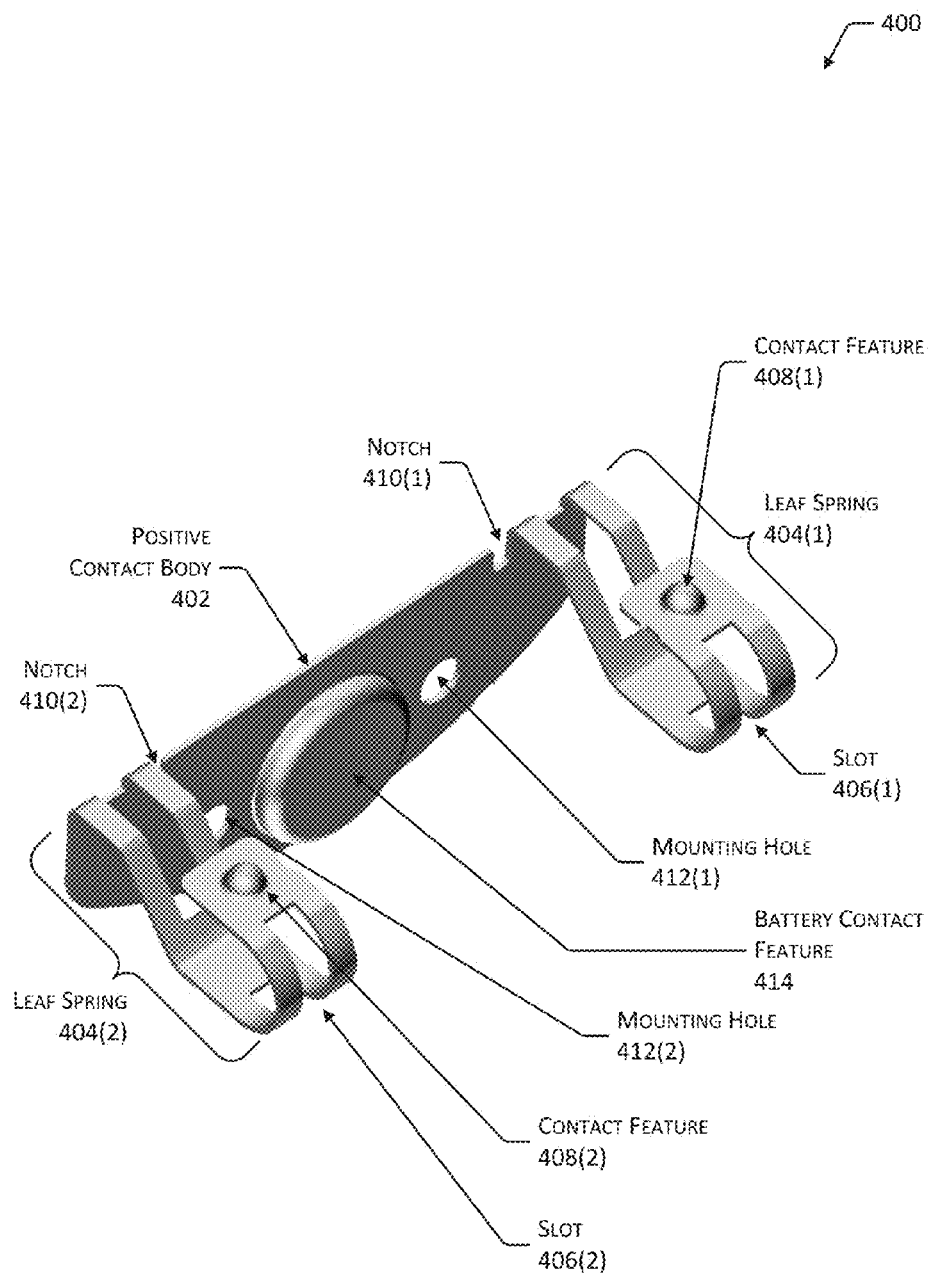
FIG. 4 illustrates a first view of the positive battery contact.

FIG. 4 illustrates a first view 400 of the positive battery contact 110. A positive contact body 402 is depicted. Extending from the positive contact body 402 are one or more leaf springs 404. In this illustration, two leaf springs 404(1) and 404(2) are shown extending substantially perpendicularly away from a plane of the positive contact body 402. Each leaf spring 404 may include one or more slots 406, holes, or other features. The slots 406 may be used to adjust resilience of the leaf spring 404. For example, a leaf spring 404 which has a slot 406 may be deflected a given amount by a lesser imposed force than the leaf spring 404 without a slot 406. In some implementations the leaf spring 404 may include a plurality of slots 406. Furthermore, one or more of the slots 406 may extend from the leaf spring 404 to the positive contact body 402.

The leaf spring 404 may include one or more arcuate or bent portions or sections. The leaf spring 404 may include one or more bends such that a distal portion of the leaf spring 404 is directed back towards the positive contact body 402. A first bend may direct the leaf spring 404 perpendicularly away from the positive contact body 402. Additional bends may displace the material of the leaf spring 404 to form a spring element. The leaf spring 404 may include one or more layers of material. For example, the leaf spring 404 may be a single thickness of spring steel, or have several layers of material.

The distal portion of the leaf spring 404 may include one or more contact features 408. For example, as shown here, the distal portion of the leaf spring 404 includes a contact feature 408 formed as a hemisphere. In this illustration, the distal portion of the leaf spring 404 is pointed back towards the positive contact body 402. In other implementations configurations may be used. For example, the distal portion of the leaf spring 404 may be pointed away from the positive contact body 402.

In some implementations different leaf springs 404 on the same positive battery contact 110 may have different configurations. For example, the first leaf spring 404(1) may have two slots 406 while the second leaf spring 404(2) may have no slots. In another implementation, the first leaf spring 404(1) may have a different set of curves or bends compared to the second leaf spring 404(2), may be oriented in a different direction, and so forth.

A notch 410 or other feature may be provided in the positive contact body 402 proximate to the leaf spring 404. This notch 410 may reduce mechanical strain on material which comprises the positive battery contact 110. For example, the positive battery contact 110 may be formed from a single contiguous piece of material, such as spring steel. By fabrication operations such as stamping, cutting, bending, punching, and so forth, the positive battery contact 110 may be formed into the shape depicted in this view 400.

The positive contact body 402 may include one or more mounting holes 412 or other features. The mounting holes 412 are configured to engage a corresponding member and maintain placement of the positive battery contact 110 within the electronic device 100. For example, the mounting holes 412 may engage posts extending from the battery compartment 106. In some implementations, the positive battery contact 110 may be heat staked to the first body 102 by applying heat and pressure to the posts and deforming at least a portion to become larger than the mounting holes 412. In another implementation, the positive battery contact 110 may be retained within the first body 102 by way of friction fit, adhesive, or other retention features.

The positive contact body 402 may also have one or more battery contact features 414. The battery contact feature 414 is configured to accept contact with a positive terminal of a set of one or more batteries 302 positioned in the battery compartment 106. The battery contact feature 414 may be a raised feature, such as depicted here, which is arranged towards the intended position of the battery 302 during use. For example, the battery contact feature 414 may comprise a protrusion relative to a plane of the positive contact body 406, such that the protrusion is disposed toward the battery 302. This implementation may provide some mechanical resilience or deflection in the battery contact feature by the battery 302 while in use, which may improve electrical contact, physical contact, and so forth. In other implementations, the battery contact feature 414 may be a recess, relative to the battery 302, in the positive contact body 402. This recess may be configured with a shape complementary to the terminal of the battery. For example, the recess may be configured with an approximate size and shape which corresponds to the protrusion of a positive terminal of a AAA battery.

In some implementations a portion of the positive contact body 402 which is proximate to the battery 302 after installation may be covered with an electrically insulating material while the battery contact feature 414 remains exposed. While a single battery contact feature 414 is depicted, in some implementations a plurality of battery contact features 414 may be arranged on the positive contact body 402 to allow for contact with a plurality of batteries 302.

In another implementation, the positive contact body 402 may be an electrically non-conductive material while the battery contact feature 414 may comprise an electrically conductive patch or pad. The battery contact feature 414 is in electrical contact with the one or more contact features 408 on the leaf springs 404.

The positive terminal of the battery 302, when installed, may extend through the first contact aperture 108(1) and come in contact with the battery contact feature 414. In another implementation at least a portion of the positive battery contact 110 may be within the battery compartment 106.

The positive battery contact 110 may be a single piece of material, or may be made up of one or more parts. As described above, the positive battery contact 110 may be formed from a single piece of material, such as spring steel. In another implementation, one or more of the positive contact body 402, leaf springs 404, battery contact feature 414, may be separate parts together.

The positive battery contact 110 may incorporate other features or parts. For example, in some implementations additional stiffening features such as ridges may be formed into the positive contact body 402 or a portion of the leaf springs 404. In some implementations the positive battery contact 110 may comprise a non-metallic material, such as a polymer or ceramic, and the electrically conductive path may comprise a metal trace.

Figure 5:
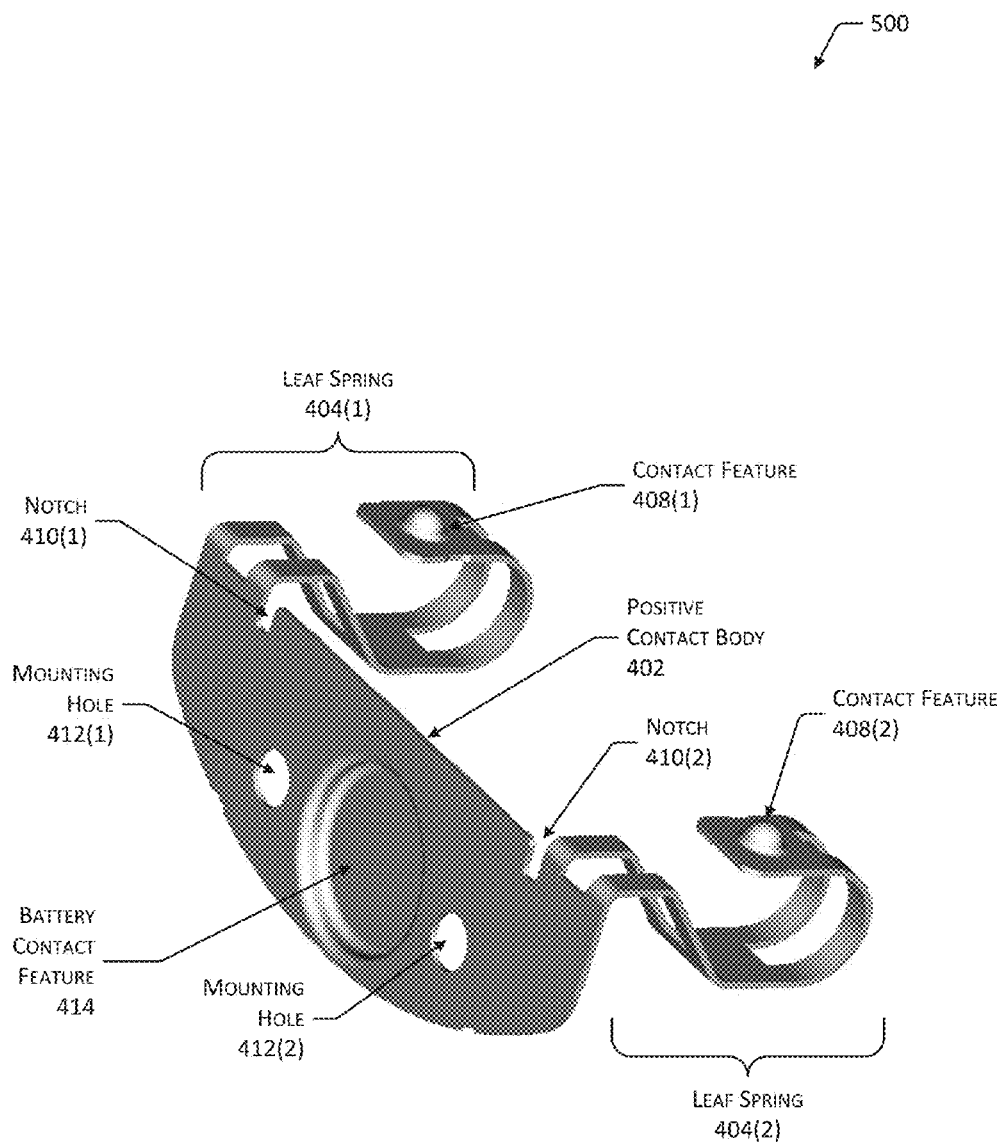
FIG. 5 illustrates a second view of the positive battery contact.

FIG. 5 illustrates a second view 500 of the positive battery contact 110 depicted in FIG. 4. The features described above are also depicted in this view. For example, the opposing side of the battery contact feature 414 is shown illustrating the extrusion of the material in the positive contact body 402 towards the position of the battery 302 when installed.

Figure 6:
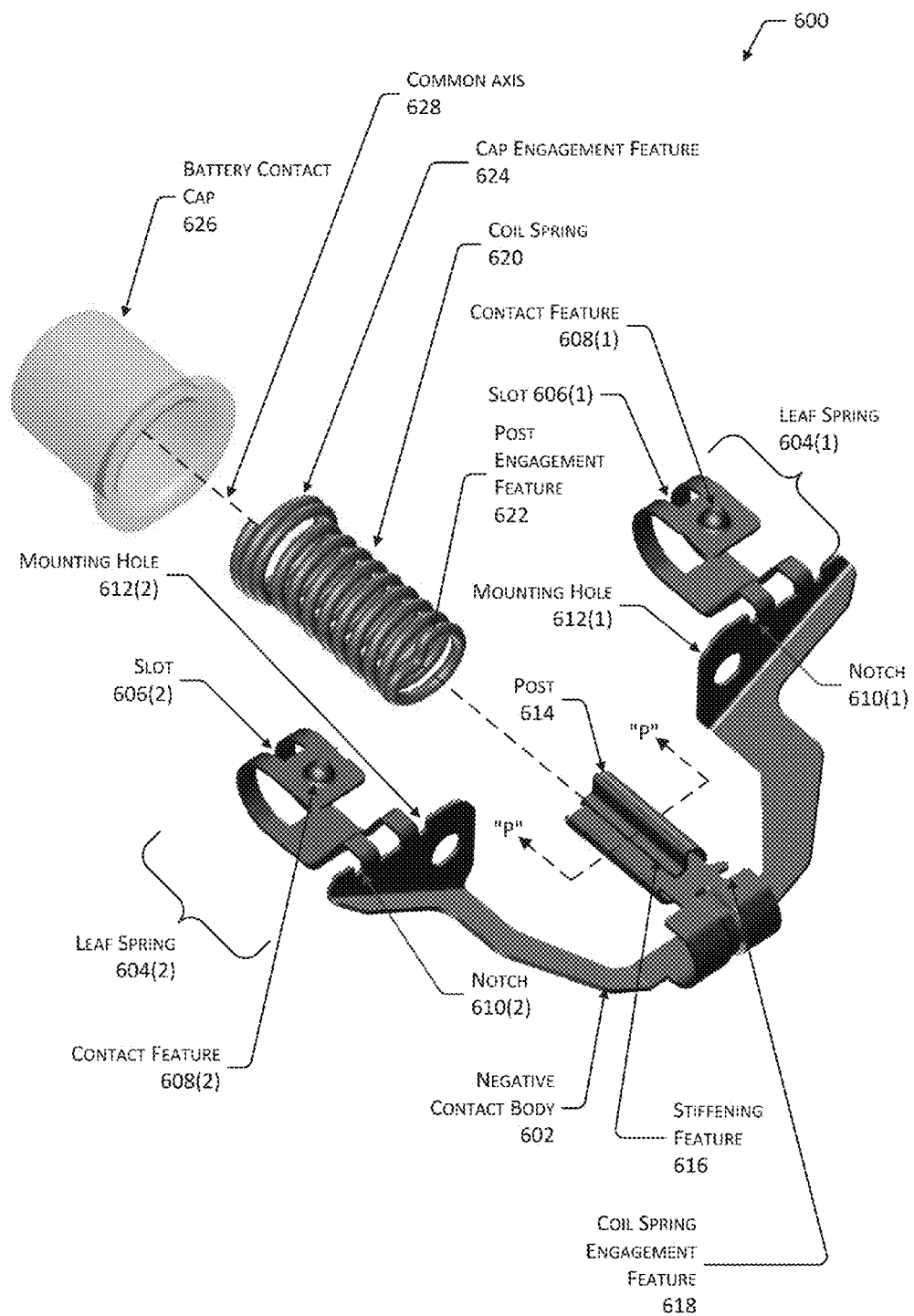
FIG. 6 illustrates a first view of the negative battery contact.

FIG. 6 illustrates an exploded first view 600 of the negative battery contact 112. The negative battery contact 112 includes a negative contact body 602. Extending from the negative contact body 602 are one or more leaf springs 604. The leaf springs 604 may be similar in construction to the leaf springs 404 of the positive battery contact 110. The leaf springs 604 may include one or more slots 606. As described above, these slots 606 may be configured to provide a particular resilience or compliance to the leaf spring 604. The leaf spring 604 includes one or more contact features 608. In one implementation, the contact feature 608 may comprise a hemisphere, as illustrated here. One or more notches 610 may be present in the negative contact body 604 adjacent to the leaf spring 604. These notches 610 may provide strain relief in the material comprising the negative contact body 602 and the leaf spring 604.

One or more mounting holes 612 may also be provided. The mounting holes 612 may be used to secure the negative contact body 602 to the first body 102, the battery compartment 106, and so forth.

The negative contact body 602 includes a post 614. The post 614 may be affixed to the negative contact body 602, or may be formed from the same material as the negative contact body 602. For example, the negative contact body 602, the leaf springs 604, and the post 614 may be formed from a single piece of material, such as spring steel. The post 614 may include one or more stiffening features 616. The stiffening feature 616 is configured to add rigidity to the post 614. In some implementations the stiffening feature 616 may include a portion of the material forming the post 614 which has been formed into a particular cross section. An exemplary cross section of the post 614 including the stiffening feature 616 is illustrated below with regard to FIG. 8. In some implementations the stiffening feature 616 may be another part which is affixed to the post 614. For example, the stiffening feature 616 may comprise a rib which is glued to the post 614 during assembly.

A coil spring engagement feature 618 may be located at a base of the post 614. The coil spring engagement feature 618 may be part of the post 614, the negative contact body 602, or both. The coil spring engagement feature 618 is configured to mechanically engage a coil spring 620. The coil spring 620 may be arranged along a common axis 628 with the post 614. For example, during assembly of the negative battery contact 112 the coil spring 620 may be positioned, such as by sliding over, the post 614. The coil spring 620 may include a post engagement feature 622 configured to mechanically engage with the post 614. For example, the post engagement feature 622 may include a generally right-angle bend in a portion of the coil spring 620 in a plane described by the portion of the coil spring 620. This right-angle bend prevents the coil spring 620 from spinning along the common axis 628 with the post 614 after installation. The coil spring engagement feature 618 may engage a portion of the coil spring 620. For example, the coil spring engagement feature 618 may comprise a tooth or ridge in the material of the post 614 which is complimentary to a portion of the coil spring 620. During installation of the coil spring 620, a portion of the coil spring 620 may be snapped into the coil spring engagement feature 618. The coil spring 620 may comprise an electrically conductive material. For example, the coil spring 620 may comprise a high-carbon steel drawn wire, such as "piano wire". While the coil spring 620 depicted here is a helical spring, in other implementations other spring configurations or structures may be used.

In some implementations, the coil spring 620 may include a cap engagement feature 624. The cap engagement feature 624 is configured to provide a mechanical interference fit between a portion of the coil spring 620 and a battery contact cap 626. In one implementation, the cap engagement feature 624 may comprise a portion of the coil spring 620 which has an increased diameter relative to the body of the coil spring 620. For example, the diameter at the midpoint of the coil spring 620 may be 1.0 mm while the cap engagement feature 624 may have a diameter of 1.1 mm.

In some implementations one or more of the coil spring engagement feature 618, the post engagement feature 622, or the cap engagement feature 624 may be omitted. For example, the battery contact cap 626, the coil spring 620, and the negative contact body 602 may be maintained in the assembled configuration based on the positioning of these components within the first body 102.

The battery contact cap 626 is configured to accept contact with a negative terminal of a set of one or more batteries 302 positioned in the battery compartment 106. The battery contact cap 626 may comprise an electrically conductive material. For example, the battery contact cap 626 may be formed from aluminum or steel. The negative battery contact 112, by way of the battery contact cap 626 as physically biased by the coil spring 620 relative to the negative contact body 602, applies compression 308 to the installed one or more batteries 302. This bias displaces the batteries 302 towards the battery contact feature 414 of the positive battery contact 110. As described above, this compression 308 may maintain physical and electrical contact between the negative battery contact 112, the batteries 302(1)-(2), and the positive battery contact 110.

In other implementations, the battery contact cap 626 may be omitted. In such an implementation, the coil spring 620 may be configured to establish physical and electrical contact with the battery 302.

The negative battery contact 112 may be a single piece of material, or may be made up of one or more parts. As described above, the negative contact body 602, the leaf springs 604, the post 614, and the stiffening feature(s) 616 may be formed from a single piece of material, such as spring steel. In another implementation, one or more of the negative contact body 602, the leaf springs 604, the post 614, or the stiffening features 616 may be separate parts.

The negative battery contact 112 is configured to provide an electrically conductive path extending from a portion of the battery contact cap 626 which is in contact with the negative terminal of the battery 302 to the one or more contact features 608. Upon assembly, current may flow from the battery 302 through these pathways to the contact pads on the circuit board 202. From the contact pads, the current may be distributed to one or more electronic components.

In some implementations the negative battery contact 112 may comprise a non-metallic material, such as a polymer or ceramic, and the electrically conductive path may comprise a metal trace.

Figure 7:
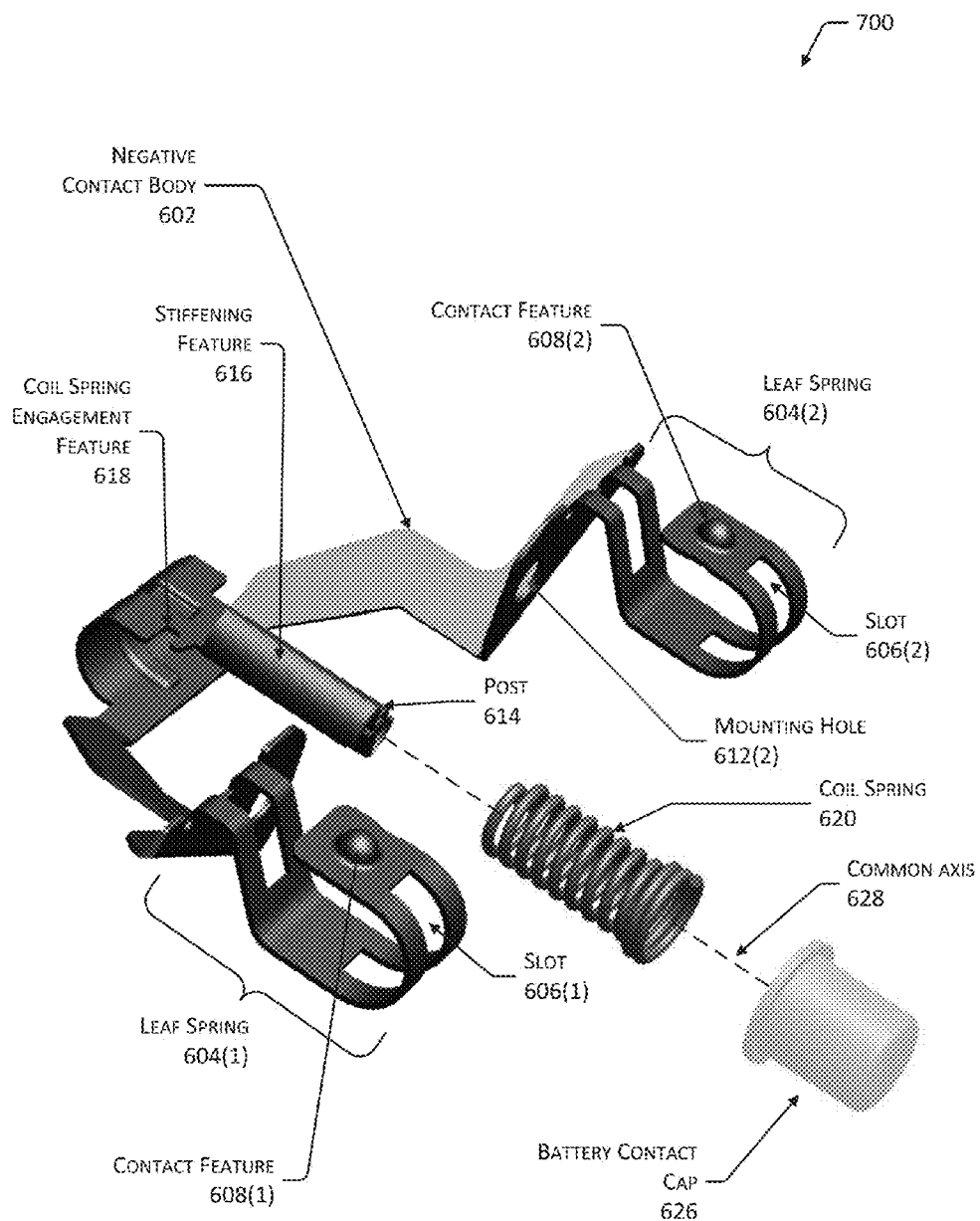
FIG. 7 illustrates a second view of the negative battery contact including a post configured to support a coil spring and battery contact cap.

FIG. 7 illustrates an exploded second view 700 of the negative battery contact 112 as depicted in FIG. 6. The features described above are also depicted in this view. For example, the arrangement of the plurality of leaf springs 604(1) and 604(2) relative to the negative contact body 602 are depicted. While a single post 614 is depicted, in some implementations the negative battery contact 112 may include two or most posts 614, coil springs 620, battery contact caps 626, and so forth.

Figure 8:
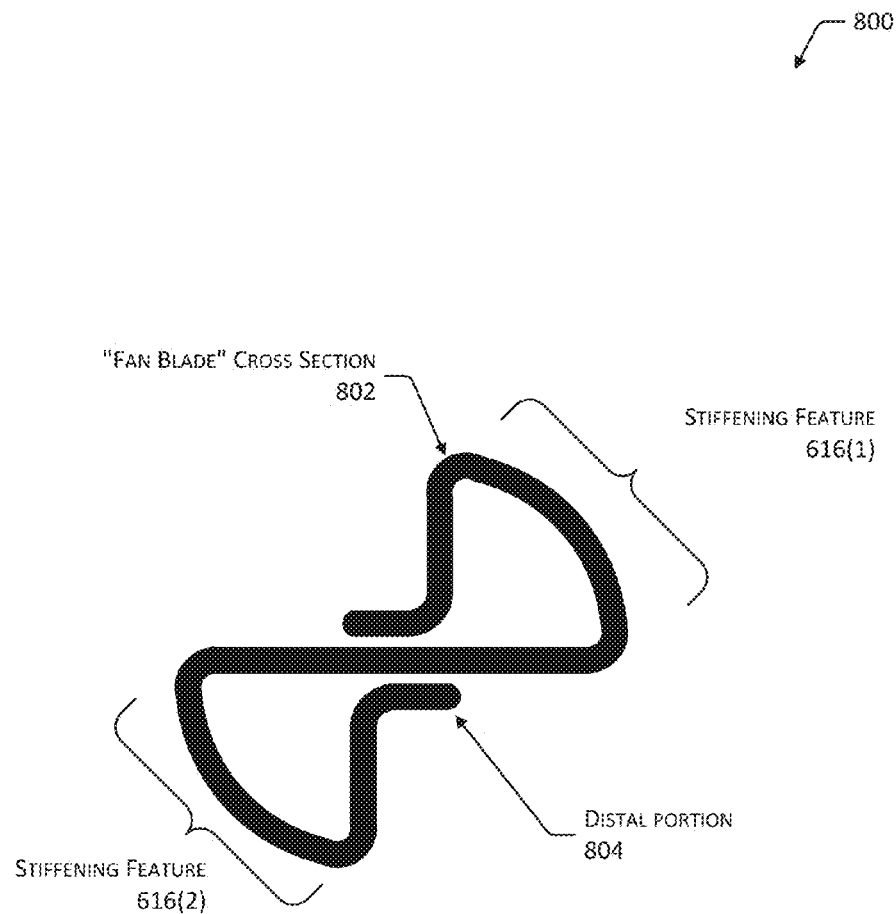
FIG. 8 illustrates a cross section of the post and configured with stiffening features.

FIG. 8 illustrates a cross section 800 of the post 614 along line P-P shown in FIG. 6. In some implementations the material comprising the post 614 may be formed into the cross section depicted here as the "fan blade" cross section 802. In this configuration, two extensions from the post 614 each have four curves. The curves produce in each extension a generally "D" or wedge cross sectional shape, forming the stiffening feature 616. A distal portion 804 of each extension may be arranged proximate to the center of the post 614 through which the common axis 628 extends. The post 614 may include a pair of the stiffening features 616(1) and 616(2), which are configured to provide rigidity to the post 614. The stiffening feature 616 and the post engagement feature 622 may also be complementary in shape to one another, such that the stiffening feature 616 engages the post engagement feature 622 and prevents the coil spring 620 from rotating about the common axis 628 of the post 614 and the coil spring 620. In some implementations the stiffening feature(s) 616 may also act as a guide to constrain movement in the coil spring 620 which is perpendicular to the common axis 628.

Figure 9:
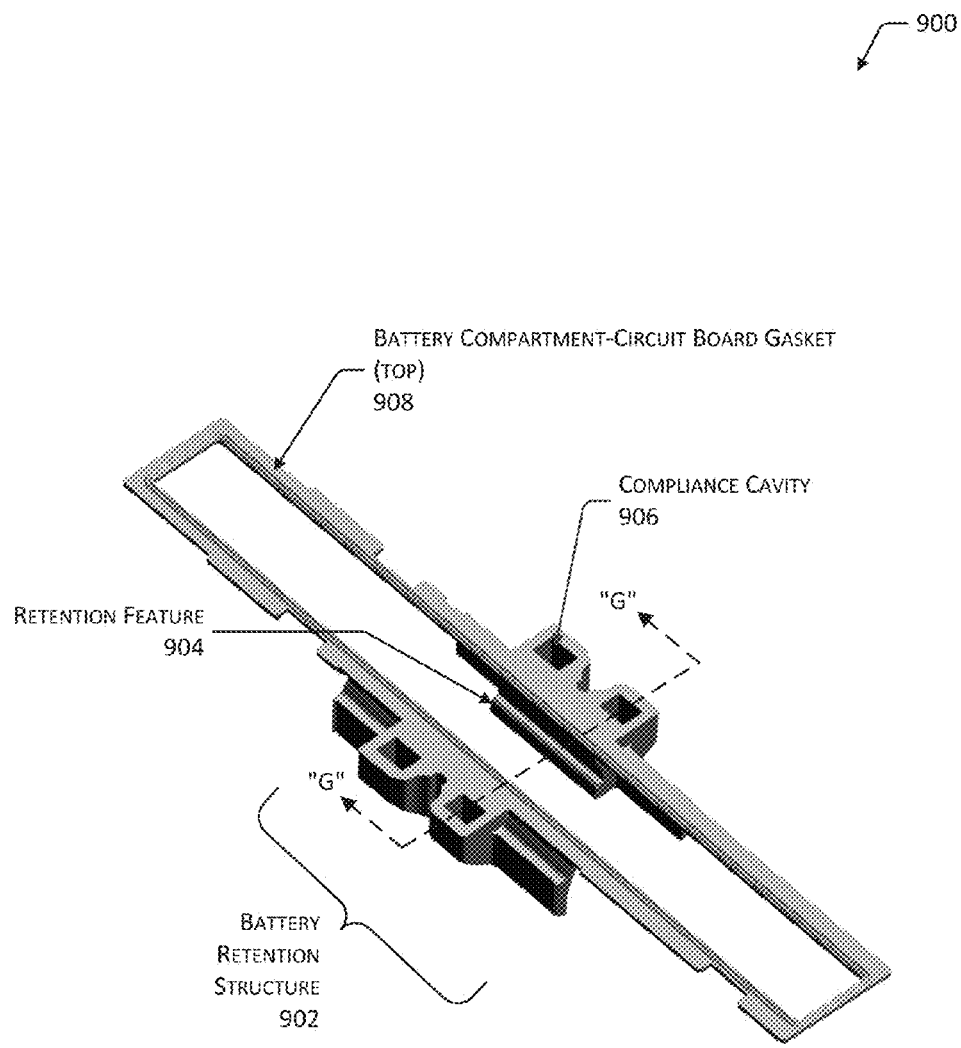
FIG. 9 illustrates an enlarged view of a first side of the battery retention device.

FIG. 9 illustrates an enlarged view 900 of a first side of the battery retention device 114. The battery retention device 114 may be comprised of one or more materials. These materials comprise an elastomeric material configured to provide some resistance to deformation by an imposed force, and return to approximately the same original shape after the imposed force is removed. For example, the battery retention device 114 may be comprised at least in part of silicone rubber.

The battery retention device 114 includes a battery retention structure 902 which may have one or more retention features 904. The battery retention structure 902 is configured to mechanically engage at least a portion of the batteries 302. For example, the battery retention structure 902 may be configured to engage a portion of a first battery 302(1) proximate to the negative terminal of the first battery 302(1) as well as a portion of a second battery 302(2) proximate to the positive terminal of the second battery 302(2). In another implementation, the battery retention structure 902 may engage another portion of the battery 302, such as a midpoint. The mechanical engagement may prevent Euler buckling after installation of the batteries 302(1) and 302(2) when arranged in tandem. This buckling or displacement of the batteries 302(1)-(2) may result from the compression 308 provided by the coil spring 620 or other spring feature.

The battery retention structure(s) 902 may be arranged within the battery compartment 106. The battery retention structure(s) 902 may be positioned at the one or more battery junctions 306 where two batteries 302 come into direct contact with one another. The battery retention structure 902 may extend lengthwise along each of the plurality of batteries away from the battery junction 306. For example, the battery retention structure 902 may extend along and engage or grasp at least a portion of each of the two batteries at the battery junction 306. In another implementation the battery retention structure 902 may grasp only one of the two batteries 302.

Figure 11:
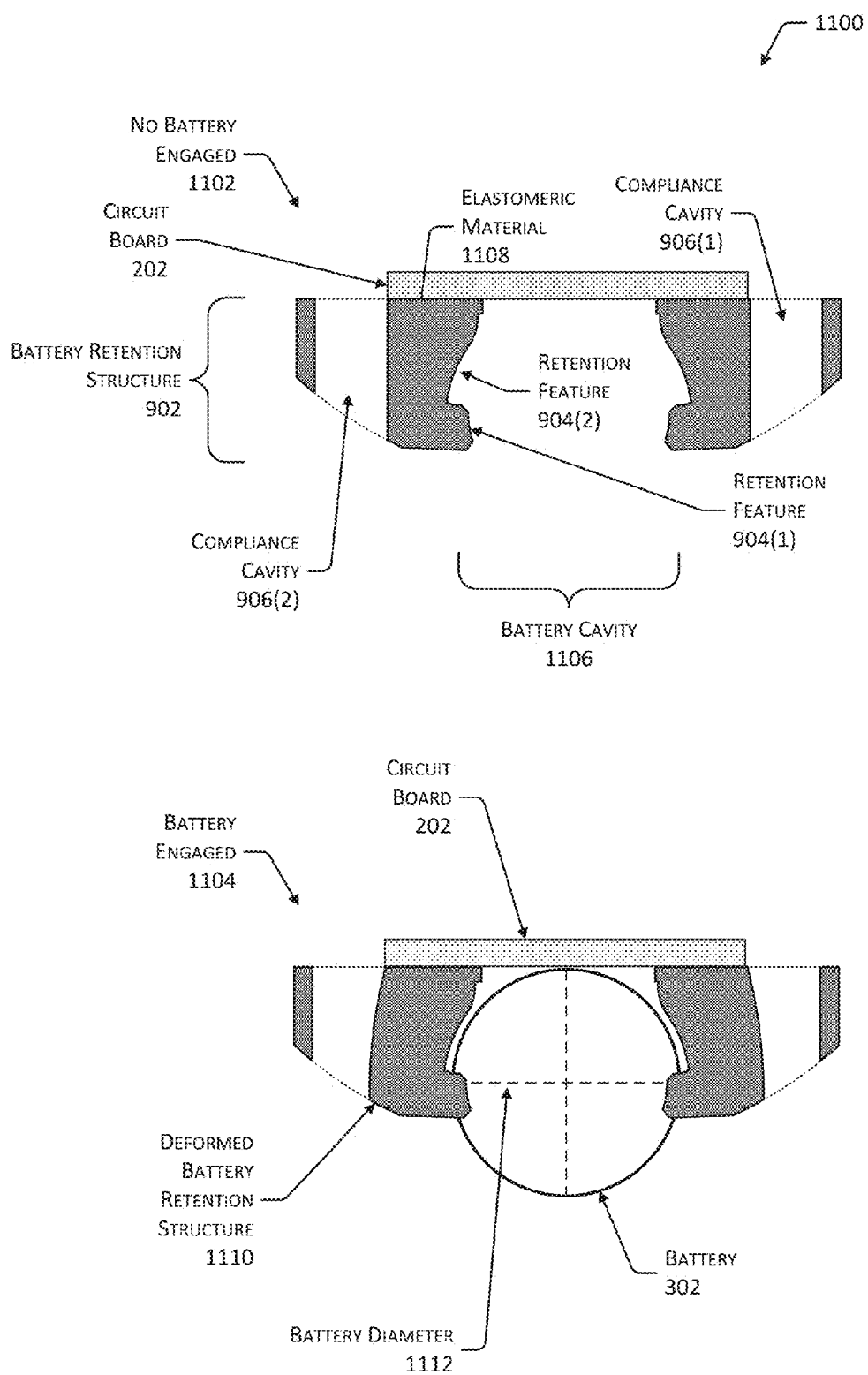
FIG. 11 illustrates a cross section of a portion of the battery retention device.

The battery retention structure(s) 902 may be arranged in other positions, such as at about the midpoint of the battery 302. In one implementation, the battery retention structure 902 may extend lengthwise from a first fixed end of the battery compartment 106 to a second fixed end. The battery retention structure 902 may be configured to engage the battery 302 on opposing sides, or on a single side. This is discussed in more detail below with regard to FIG. 11 depicting a cross section of the battery retention structure 902.

One or more retention features 904 are incorporated into the battery retention structure 902. These retention features 904 may include features such as ridges, concavities, convexities, bumps, dimples, and so forth. These retention features 904 are configured to provide positive mechanical engagement by way of the elastomeric material's tendency to resume a previous shape. For example, during insertion or removal of the batteries 302, the elastomeric material of the battery retention structure 902 may deform or deflect, providing clearance for passage of the portion of the battery 302 in or out of the battery compartment 106. Once inserted, the resilience of the battery retention structure 902 may result in a portion of the battery retention structure 902 attempting to return to approximately the pre-deformation state. The mechanical engagement may be provided at least in part by the resilience of the elastomeric material applying pressure to the battery 302. For example, the retention features 904 may comprise ridges which hold the batteries 302 in the battery compartment 106 and prevent Euler buckling due to the compression 308.

One or more compliance cavities 906 may be provided within at least a portion of the battery retention structure 902 to change provide a predetermined resistance to displacement of a portion of the battery retention structure 902, such as the one or more retention features, in response to an applied force, such as during installation or removal of the batteries 302. The compliance cavity 906 may be created during formation of the battery retention structure 902, or drilled, cut, punched, and so forth. The compliance cavity 906 may provide a channel and extend through a portion of the battery retention structure 902. In some implementations the compliance cavity 906 may comprise a void, pocket, or less dense portion of the material of the battery retention structure 902.

The battery retention device 114 may include an integral battery compartment-circuit board gasket ("gasket") 908. The gasket 908 may be arranged at an interface between at least a portion of the circuit board 202 and battery compartment 106 of the first body 102. The gasket 908 provides a physical connection between the battery compartment 106 and the circuit board 202.

The gasket 908 may prevent migration of foreign materials such as dirt or water from the battery compartment 106 into other interior portions of the device 100. The gasket 908 may also provide mechanical support to the circuit board 202. For example, the circuit board 202 may include buttons which a person may press, applying a force which is perpendicular to the circuit board 202 and directed down towards the first body 102. The gasket 908 provides support for the circuit board 202, minimizing or elimination flexure of the circuit board 202 due to this imposed force.

The battery retention device 114 may be coupled to the first body 102 by adhesive, mechanical fit, mechanical fastener, and so forth. For example, the battery retention device 114 may include features such as grooves or channels which mechanically engage at least a portion of the walls of the battery compartment 106.

Figure 10:
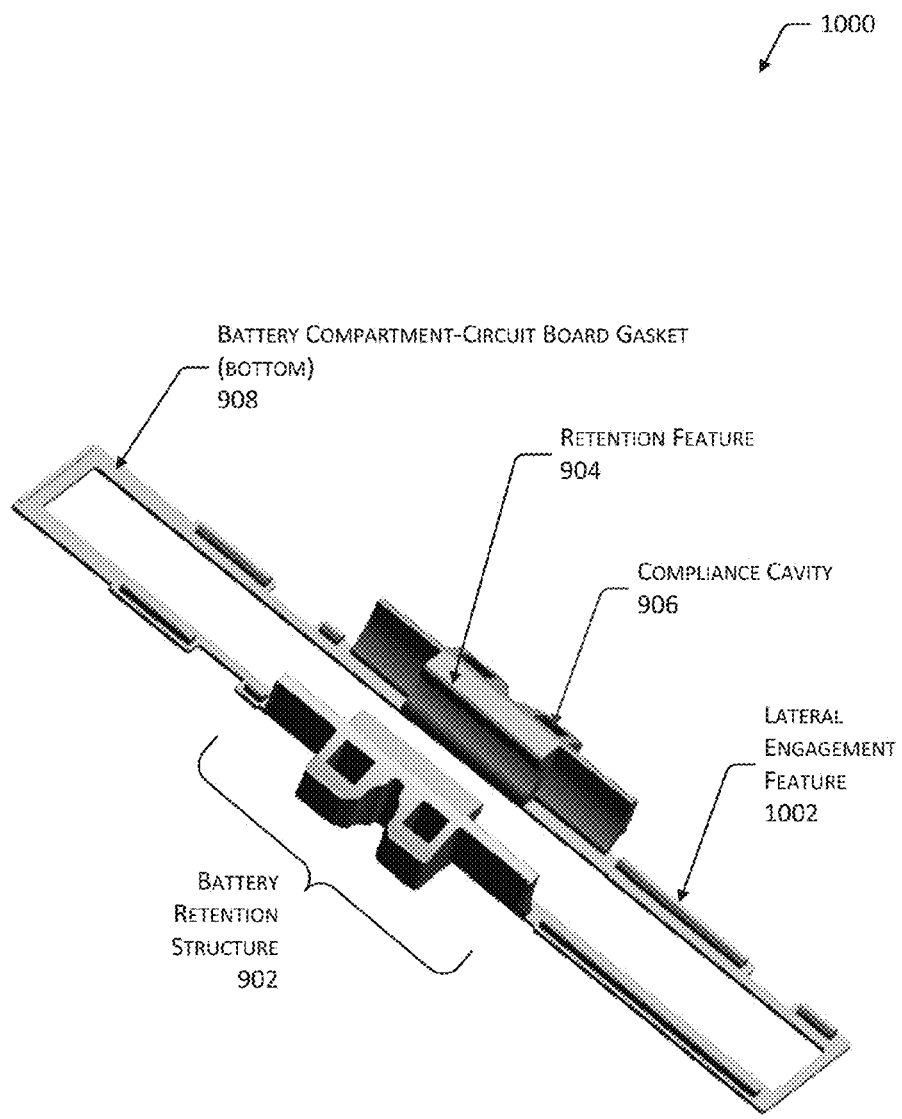
FIG. 10 illustrates an enlarged view of a second side of the battery retention device.

FIG. 10 illustrates an enlarged view 1000 of a second side of the battery retention device 114. In this view, the battery retention device 114 is depicted in an inverted or "upside down" orientation. As illustrated here, the battery retention structure 902 includes the retention features 904 configured to mechanically engage one or more batteries 302.

The battery compartment 106 may include one or more cutouts or features configured to accept the battery retention structure 902, the gasket 908, or both. The battery retention device 114 may include features configured to engage one or more portions of the first body 102, such as the edges of the battery compartment 106. In this illustration, a plurality of lateral engagement features 1002 are arranged around an underside of the gasket 906. These lateral engagement features 1002 may be configured to engage corresponding slots in the battery compartment 106 when assembled.

While a single battery retention structure 902 is depicted, in some implementations the battery retention device 114 may include a plurality of battery retention structures 902. These may be arranged throughout the battery compartment 106.

FIG. 11 illustrates a cross sectional views 1100 of a portion of the battery retention structure 902 of the battery retention device 114. The views depicted are through line "G-G" as indicated in FIG. 9.

The battery retention structure 902 is shown in a no battery engaged state 1102 and a battery engaged state 1104. The battery retention structure 902 includes a battery cavity 1106 in the battery retention structure 902. The battery cavity 1106 is configured to accommodate at least a portion of the battery 302. In the implementation illustrated here, the battery cavity 1106 may have a generally concave shape, describing a cove. As described above, the battery retention structure 902 may comprise an elastomeric material 1108. The elastomeric material 1108 may be deformed by an applied force, but will return to generally the same shape once the applied force is removed.

Several different retention features 904 are depicted here. A ridge retention feature 904(1) extends from a body of the elastomeric material 1108 and into the battery cavity 1106. A concave retention feature 904(2) may be generally shaped to accommodate the cross section of the battery 302 once the battery 302 is installed in the battery compartment 106. Also depicted are the compliance cavities 906 extending through this portion of the battery retention structure 902.

The battery retention features 904 are depicted as being symmetrically arranged within the battery cavity 1106. For example, the retention features 904(1) and 904(2) are arranged on opposing sides of the battery cavity 1106. In some implementations the battery retention structure 902 may be asymmetrical. For example, in some implementations the retention feature(s) 904 may be arranged only on one side of the battery 302.

The battery engaged 1104 view depicts the battery retention structure 902 after the battery 302 has been inserted. With the battery engaged 1104, the retention features 904 of the deformed battery retention structure 1110 hold the battery 302 within the battery compartment 106. The mechanical engagement may be provided at least in part by resilience of the elastomeric material in the deformed battery retention structure 1110 applying pressure to the one or more batteries 302 after insertion.

The battery retention structures 902 may be configured with one or more surface features or additives which permit motion along the tandem axis 304 of the batteries 302 while constraining motion perpendicular to the tandem axis 304. For example, the lining of the battery cavity 1106 may have a texture or surface finish which allows the batteries 302 to slide along the tandem axis 304 responsive to the compression 308. In another example, the composition of the elastomeric material using one or more additives or variations in fabrication processes to facilitate the motion along the tandem axis.

The battery engaged view 1104 depicts this portion of the battery retention structure 902 when the battery 302 is emplaced. The battery 302 may be relatively rigid or non-compliant. As a result, insertion into the battery cavity 1106 may result in displacement or deformation of the elastomeric material 1108. In this illustration, the battery 302 has displaced a portion of the elastomeric material 1108 on both sides of the battery cavity 1106 at least partially into the compliance cavities 906(1) and 906(2).

The batteries 302 may have a substantially circular cross section, such as depicted here. To engage such a circular cross section, the battery retention structure 902 may be configured to position one or more retention features 904 such as the ridges which extend at or beyond a battery diameter 1112. For example, the ridge retention features 904(1) are configured to engage the battery 302 at the battery diameter 1112, such that a majority of the battery 302 is within the battery retention structure 902.

Figure 12:
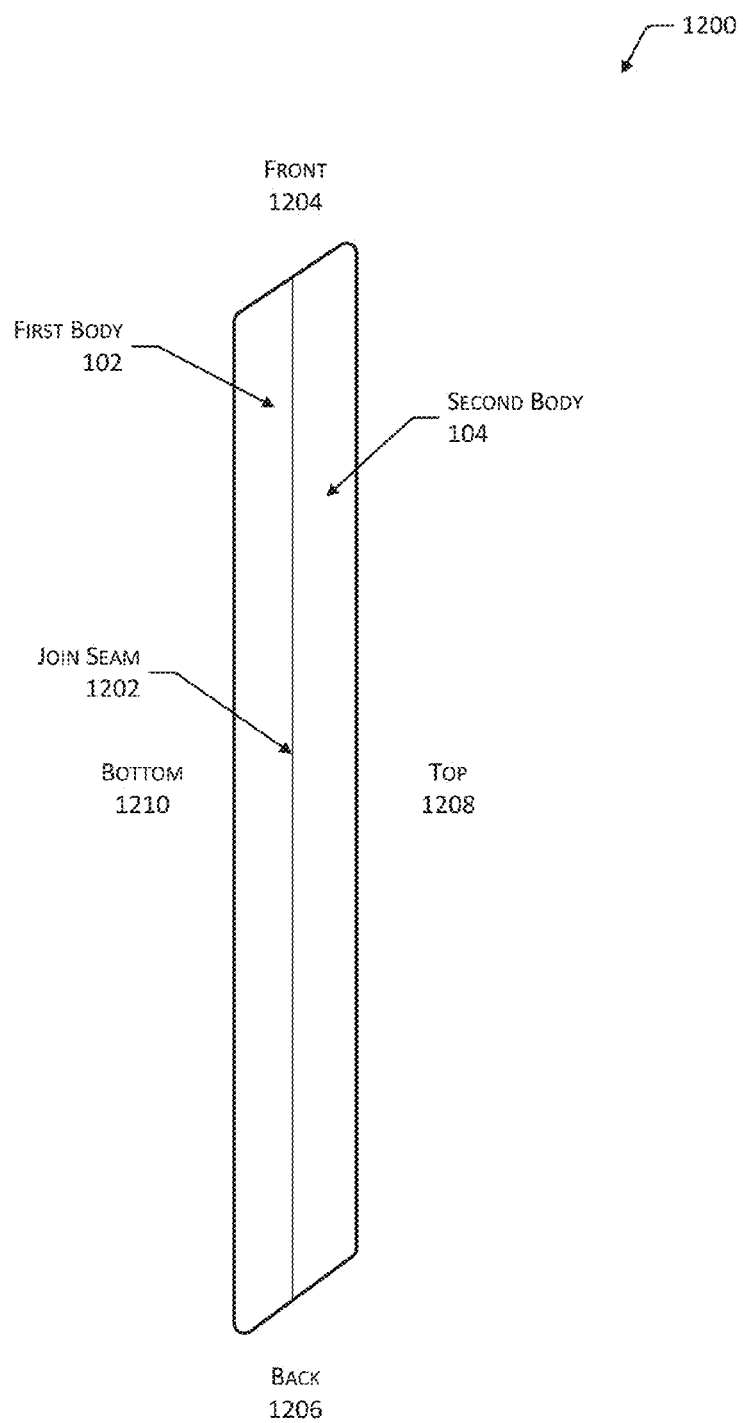
FIG. 12 illustrates an exterior view of the first body and the second body in an assembled configuration.

FIG. 12 illustrates an exterior side view 1200 of the first body 102 and the second body 104 in an assembled configuration. A join seam 1202 describes the interface between the first body 102 and the second body 104 when assembled.

The components described in this disclosure allow for the first body 102 and the second body 104 to be assembled without soldering. The contact features 408 and 608 engage the contact pads on the circuit board 202 and provide an electrical pathway to the electronic components of the circuit board 202. The battery retention device 114 maintains the batteries 302 in the battery compartment 106, while providing mechanical support for the circuit board 202 in the assembled device 100.

For illustration, and not by way of limitation, this figure illustrates a front 1204, a back 1206, a top 1208, and a bottom 1210 of the device. As illustrated here, the join seam 1202 extends from the front 1204 to the back 1206 of the device 100. In other implementations the join seam 1202 may extend from top 1208 to bottom 1210, or as some other angle.

Illustrative Processes

Figure 13:
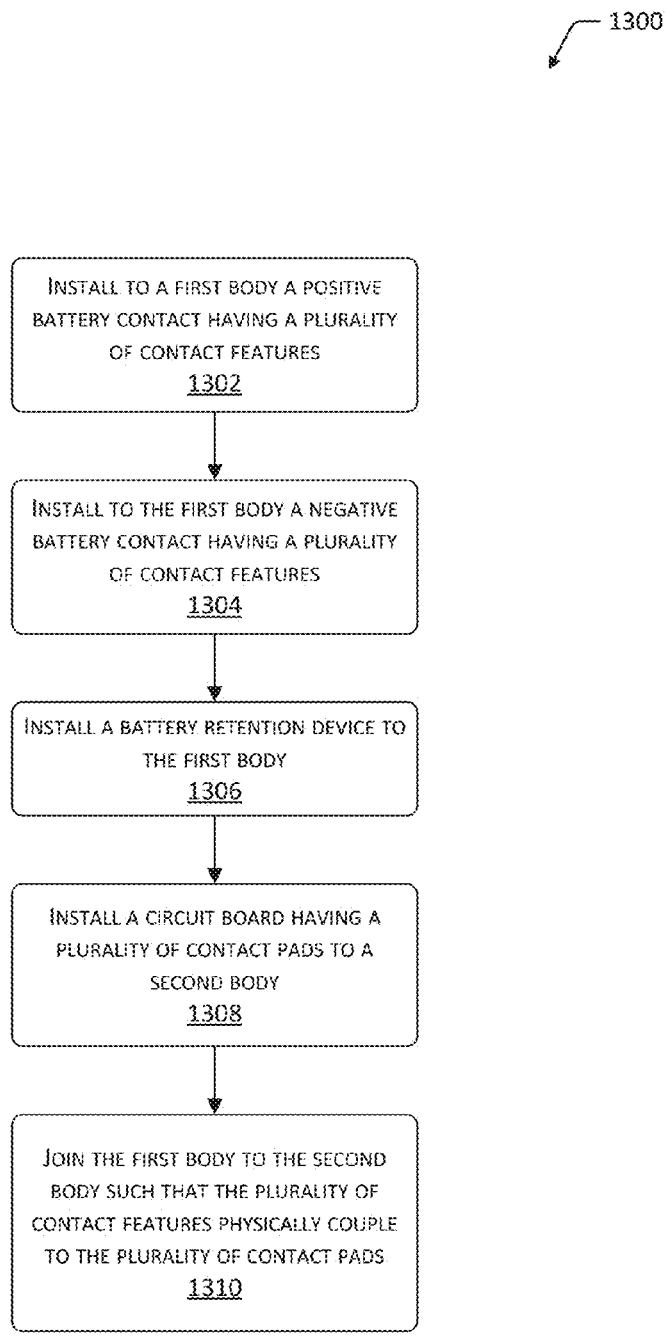
FIG. 13 is a flow diagram of a process of assembling the device using the solderless battery contacts and the battery retention device.

FIG. 13 is a flow diagram 1300 of a process of assembling the device 100. Manual steps, automated equipment, or a combination may implement this process. At 1302 the positive battery contact 110 is installed to the first body 102. The positive battery contact 110 is installed such that the battery contact feature 414 is proximate to the contact aperture 108(1). The positive battery contact 110 may be installed using one or more of adhesive, friction fit, mechanical fasteners, and so forth.

This installation may include physical placement of the positive battery contact 110 such that the mounting holes 412 engage one or more mounting posts or features. The positive battery contact 110 may be heat staked to the first body 102 by applying heat and pressure to the mounting posts and deforming at least a portion to a shape larger than the mounting holes 412. In another implementation, the positive battery contact 110 may be retained within the first body 102 by way of friction fit, adhesive, or other retention features.

As described above with regard to FIG. 4, the positive battery contact 110 may include one or more leaf springs 404 having one or more contact features 408.

At 1304, the negative battery contact 112 is installed to the first body 102. The negative battery contact 112 is installed such that the coil spring 620, the battery contact cap 626, or a portion of both, passes at least partially through to the contact aperture 108(2) into the battery compartment 106.

The negative battery contact 112 may installed using one or more of adhesive, friction fit, mechanical fasteners, and so forth.

The installation may include physical placement of the negative battery contact 112 such that the mounting holes 612 engage one or more mounting posts or features. The negative battery contact 112 may be heat staked to the first body 102 by applying heat and pressure to the posts and deforming at least a portion to a shape larger than the mounting holes 612. In another implementation, the negative battery contact 112 may omit the mounting holes 612, and may be retained within the first body 102 by way of friction fit, or other retention features.

As described above with regard to FIG. 6, the negative battery contact 112 may include one or more leaf springs 604 having one or more contact features 608.

At 1306 the battery retention device 114 is installed to the first body 102. For example, the complete battery retention device 114 may be placed into the first body 102. In another implementation, the battery retention device 114 may be formed into the first body 102.

At 1308 a circuit board having a plurality of contact pads is installed to the second body 104. The contact pads may comprise flat or contoured features configured to come into contact and provide an electrically conductive pathway with the contact features 408 and 608. In some implementations a single contact pad may be associated with each of the contact features 408 or 608. In another implementation, a contact pad may be shared by multiple contact features 408 or 608. For example, the contact pad for the positive battery contact 110 may comprise a single rectangular strip extending across the circuit board 202. The circuit board 202 is installed such that, when the first body 102 and the second body 104 are joined, the contact pads come into contact with the contact features 408 and 608. The circuit board 202 may installed using one or more of adhesive, friction fit, mechanical fasteners, and so forth.

At 1310 the first body 102 is joined to the second body 104. Once joined, the plurality of contacts features 408 and 608 physically couple to the plurality of corresponding contact pads on the circuit board 202. The physical coupling forms an electrically conductive pathway. The first body 102 and the second body 104 may be joined to one another using one or more of adhesive, friction fit, mechanical fasteners, and so forth.

Figure 14:
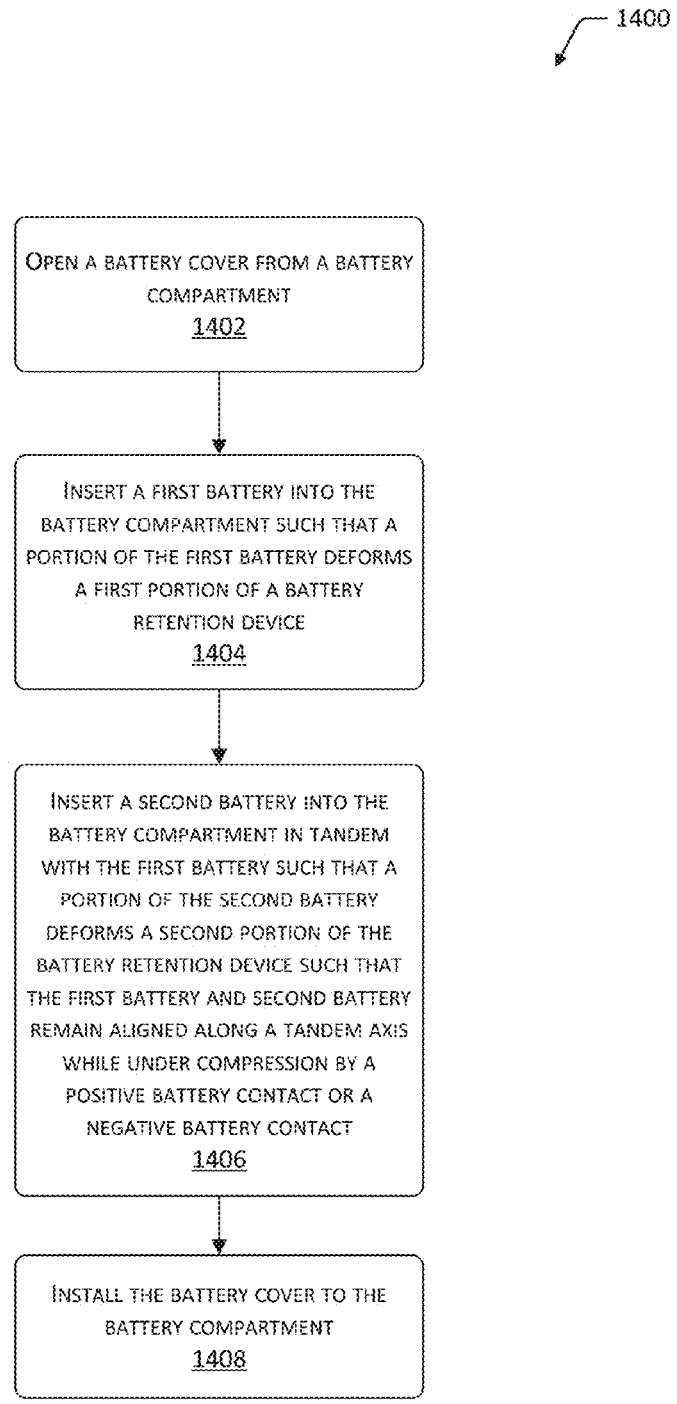
FIG. 14 is a flow diagram of a process of installing a plurality of batteries into the electronic device having the battery retention device.

FIG. 14 is a flow diagram 1400 of a process of installing a plurality of batteries 302 into the electronic device 100 having the battery retention device 114. This process may be accomplished manually, such as by a person.

At 1402, a battery cover of the battery compartment 106 is opened. For example, the battery cover may be retained with a mechanical interference fit, latch, and so forth.

At 1404 a first battery 302(1) is inserted into the battery compartment 106. During insertion, mechanical pressure is applied, by a person or device, to the first battery 302(1). This pressure deforms a first portion of a battery retention device 114. For example, where the first battery 302(1) has a positive terminal in contact with the positive battery contact 110, a portion of the first battery 302(1) casing proximate to a negative terminal may displace a portion of the battery retention structure 902. As described above with regard to FIGS. 9-11, the one or more retention features 904 engage the first battery 302(1).

At 1406, a second battery 302(2) is inserted into the battery compartment 106 in tandem with the first battery 302(1). During insertion, the mechanical pressure to the second battery 302(2) deforms at least a second portion of the battery retention structure 902. Because the battery retention structure 902 comprises a resilient material, once the mechanical pressure is removed from the batteries 302(1)-(2), the battery retention feature 902 maintains the alignment along the tandem axis 304.

As described above, the negative battery contact 112 may be configured with a spring element such as the coil spring 620 which applies a compression 308 to the batters 302(1)-(2). Because of the engagement by the battery retention structure 902, Euler buckling in this column of batteries 302 is prevented. As described above, movement along the tandem axis 304 remains possible, allowing the compression 308 to maintain physical and electrical contact between the positive battery contact 110, the batteries 302, and the negative battery contact 112.

At 1408, the battery cover to the battery compartment 106 may be closed. Because of the engagement by the battery retention structure 902, closure is unimpeded by the buckling of the batteries 302 at the battery junction 306. Furthermore, mechanical engagement of the batteries 302 by the battery retention structure 902 prevents rattling of the batteries 302 within the battery compartment 106.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the devices and techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising a battery compartment configured to hold a set of one or more batteries, wherein the battery compartment includes:
    a first contact aperture at a first end and a second contact aperture at a second end, wherein the first contact aperture is configured to pass a positive terminal of a battery in the set of one or more batteries through the first end and prevent a negative terminal of the battery in the set of one or more batteries from passing through the first end;
    a positive battery contact proximate to the first end of the battery compartment, the positive battery contact comprising:
    a positive contact body having a battery contact feature configured to be mounted in the first body proximate to the first contact aperture, wherein the battery contact feature is configured to contact, through the first contact aperture, the positive terminal protruding from the set of one or more batteries positioned in the battery compartment; and
    a plurality of leaf springs extending from the positive contact body, each leaf spring including one or more arcuate sections and one or more contact features;
    a negative battery contact at a second end of the battery compartment, the negative battery contact comprising:
    a negative contact body having a post and configured to be mounted in the first body proximate to the second contact aperture, wherein the post comprises one or more stiffening features and a coil spring engagement feature;
    a coil spring arranged along a common axis with the post and having a post engagement feature configured to couple to the coil spring engagement feature;
    a battery contact cap configured to couple to the coil spring, wherein a portion of the battery contact cap is configured to pass through the second contact aperture and contact a negative terminal on the set of one or more batteries positioned in the battery compartment and the coil spring is configured to bias the portion of the battery contact cap through the second contact aperture; and
    a plurality of leaf springs in extending from the negative contact body, each leaf spring including one or more arcuate sections and one or more contact features; and
    a circuit board comprising a plurality of electrical contact pads, the electrical contact pads arranged to come into contact with the one or more contact features of the first plurality of leaf springs and the second plurality of leaf springs upon placement proximate to the first body.

2. The device of claim 1, wherein the one or more contact features comprise hemispheres configured such that a portion of the hemisphere contacts the electrical contact pads upon placement proximate to the circuit board.

3. The device of claim 1, the coil spring further comprising a cap engagement feature comprising one or more coils of the coil spring proximate to the battery contact cap, the one or more coils having a diameter greater than an inner diameter of the battery contact cap; and
    wherein the post engagement feature comprises a portion of the coil spring proximate to the negative contact body having a right-angle bend within a plane described by the portion of the coil spring.

4. The device of claim 1, wherein at least one leaf spring extending from one or more of the positive contact body or the negative contact body is biased in a direction away from the plurality of batteries to contact the circuit board.

5. A device comprising:
    a first contact body including a battery contact feature configured to contact a terminal of a battery from a first direction;
    a first plurality of leaf springs, each leaf spring comprising:
        two or more bends, a first bend directing the leaf spring perpendicularly away from the first contact body, and a second bend directing a distal portion of the leaf spring back towards the first contact body; and
    one or more contact features on the distal portion of the leaf spring, wherein the one or more contact features are coupled by an electrically conductive path to the battery contact feature, wherein the one or more contact features extend from the leaf spring in a second direction non-parallel relative to the first direction.

6. The device of claim 5, the first contact body comprising a single contiguous piece of material.

7. The device of claim 5, wherein the first contact body comprises a non-metallic material and the electrically conductive path comprises a metal trace.

8. The device of claim 5, wherein the battery contact feature comprises a protrusion relative to a plane of the first contact body, such that the protrusion is configured to be disposed toward the battery while in use, wherein the protrusion is configured to be deflected at least in part by the terminal of the battery while in use.

9. The device of claim 5, wherein the battery contact feature comprises a recess relative to a plane of the first contact body, such that the recess is configured to be disposed away from the battery while in use, and further wherein the recess is configured to have a shape complementary to the terminal of the battery.

10. The device of claim 5, further comprising:
a battery compartment configured to hold one or more batteries, wherein the battery compartment has a first contact aperture at a first end and a second contact aperture at a second end, and further wherein the first contact aperture is configured to pass a first terminal of the one or more batteries through the first end so as to come into contact with the battery contact feature of the first contact body and prevent a second terminal of the one or more batteries from passing through the first end; and
wherein the first contact body is arranged at one end of the battery compartment such that the battery contact feature is proximate to the first contact aperture.

11. The device of claim 10, further comprising:
a second contact body configured to be mounted proximate to the second contact aperture;
a post; and
a coil spring arranged around at least a portion of the post, wherein the coil spring is configured to pass through the second contact aperture and contact the second terminal on the one or more batteries positioned in the battery compartment.

12. The device of claim 11, further comprising:
a second plurality of leaf springs extending from the second contact body;
one or more contact features on the distal portion of each leaf spring of the second plurality of leaf springs, wherein the one or more contact features are coupled by an electrically conductive path to the coil spring; and
a circuit board comprising a plurality of electrical contact pads, the electrical contact pads arranged to come into contact with the first plurality of leaf springs and the second plurality of leaf springs upon placement proximate to the battery compartment.

13. A device comprising:
a battery compartment having a first aperture;
a first contact body;
a post;
a coil spring arranged around at least a portion of the post on a first side of the first aperture, wherein a portion of the coil spring is configured to apply a force to a first terminal on a first battery, the first terminal positioned on a second side of the first aperture opposite the first side; and
a first plurality of leaf springs, each leaf spring comprising: two or more bends, a first bend directing the leaf spring perpendicularly away from the first contact body, and a second bend directing a distal portion of the leaf spring back towards the first contact body; and
one or more contact features on the distal portion of the leaf spring, wherein the one or more contact features are coupled by an electrically conductive path to the coil spring.

14. The device of claim 13, wherein the post comprises one or more stiffening features and a coil spring engagement feature.

15. The device of claim 13, wherein the coil spring comprises a post engagement feature configured to couple to the coil spring engagement feature.

16. The device of claim 13, wherein:
the first contact body comprises a single piece of spring steel, and
the coil spring comprises piano wire.

17. The device of claim 13, further comprising:
a battery contact cap in communication with the coil spring and configured to provide physical and electrical contact to the first terminal on the first battery, wherein the coil spring biases at least a portion of the battery contact cap through the first aperture.

18. The device of claim 13, further comprising:
a second contact body including a battery contact feature configured to contact a second terminal of one or more of the first battery or a second battery electrically coupled to the first battery.

19. The device of claim 18, wherein the second contact body comprises a single piece of spring steel, and further wherein the battery contact feature and the one or more contact features are formed into the spring steel.

20. The device of claim 18, further comprising:
a second plurality of leaf springs extending from the second contact body;
one or more contact features on the distal portion of each leaf spring of the second plurality of leaf springs, wherein the one or more contact features are coupled by an electrically conductive path to the battery contact feature; and
one or more circuit boards comprising one or more electrical contact pads, the electrical contact pads arranged to come into contact with the one or more contact features of the first plurality of leaf springs and the second plurality of leaf springs and establish an electrically conductive pathway without soldering.

* * * * *